United States Patent
Girondi

(10) Patent No.: US 12,516,616 B2
(45) Date of Patent: Jan. 6, 2026

(54) OIL TEMPERATURE MANAGEMENT ASSEMBLY

(71) Applicant: UFI INNOVATION CENTER S.R.L., Trento (IT)

(72) Inventor: Giorgio Girondi, Trento (IT)

(73) Assignee: UFI INNOVATION CENTER S.R.L., Trento (IT)

( * ) Notice: Subject to any disclaimer, the term of this patent is extended or adjusted under 35 U.S.C. 154(b) by 84 days.

(21) Appl. No.: 18/702,503

(22) PCT Filed: Oct. 12, 2022

(86) PCT No.: PCT/IB2022/059783
§ 371 (c)(1),
(2) Date: Apr. 18, 2024

(87) PCT Pub. No.: WO2023/067440
PCT Pub. Date: Apr. 27, 2023

(65) Prior Publication Data
US 2025/0270944 A1    Aug. 28, 2025

(30) Foreign Application Priority Data

Oct. 19, 2021 (IT) .................. 102021000026771

(51) Int. Cl.
*F01P 3/00* (2006.01)
*F01M 5/00* (2006.01)
(Continued)

(52) U.S. Cl.
CPC ............. *F01M 5/007* (2013.01); *F28D 9/005* (2013.01); *F28F 27/02* (2013.01); *F28D 2021/0089* (2013.01)

(58) Field of Classification Search
CPC .. F28D 9/005; F28D 2021/0089; F28F 27/02; F28F 2280/06; F28F 2250/06; F01M 5/007; F01P 11/08
(Continued)

(56) References Cited

U.S. PATENT DOCUMENTS 11,187,464 B2 *  11/2021  Qiu .................. F16K 49/005
11,637,336 B2 *  4/2023   Wesner ............. H01M 10/625
                                                   429/62
(Continued)

FOREIGN PATENT DOCUMENTS

CN       108955313 A     12/2018
DE    202021102042 U1    8/2021

OTHER PUBLICATIONS

International Search Report and Written Opinion received for PCT Serial No. PCT/IB2022/059783 on Jan. 10, 2023, 11 pgs.
(Continued)

*Primary Examiner* — Logan M Kraft
*Assistant Examiner* — James J Kim
(74) *Attorney, Agent, or Firm* — Merchant & Gould P.C.

(57) ABSTRACT

An oil temperature management assembly fluidly connects to an oil circulation system of a vehicle operating unit having an auxiliary heat exchanger. The management assembly includes a primary heat exchanger and a fluid support and connection module. The module has a module body connected to the primary heat exchanger, and a thermostatic valve. The module body exclusively includes: assembly inlet and outlets mouths fluidly connectable to and second oil ducts from and to the operating unit, a primary exchanger inlet and outlet mouths connecting the primary heat exchanger and the module, the primary exchanger outlet mouth fluidly communicates with the assembly outlet mouth; an auxiliary mouth for oil to the auxiliary heat
(Continued)

exchanger. The thermostatic valve fluidly connects to the assembly inlet mouth, primary exchanger inlet mouth, and auxiliary mouth, and detects oil temperature entering the module and directs oil towards the primary exchanger inlet mouth and/or auxiliary mouth.

20 Claims, 9 Drawing Sheets

(51) Int. Cl.
  *F28D 9/00* (2006.01)
  *F28F 27/02* (2006.01)
  *F28D 21/00* (2006.01)

(58) Field of Classification Search
  USPC .................................................. 123/41.42
  See application file for complete search history.

(56) References Cited

U.S. PATENT DOCUMENTS

| | | |
|---|---|---|
| 2016/0215664 A1 | 7/2016 | Boyer |
| 2018/0299913 A1 | 10/2018 | Sheppard |
| 2020/0019198 A1* | 1/2020 | Qiu ................... G05D 23/1333 |
| 2020/0149623 A1 | 5/2020 | Muhammad |

OTHER PUBLICATIONS

Italian Search Report received for IT Serial No. 202100026771 on Jun. 3, 2022, 2 pgs.

* cited by examiner

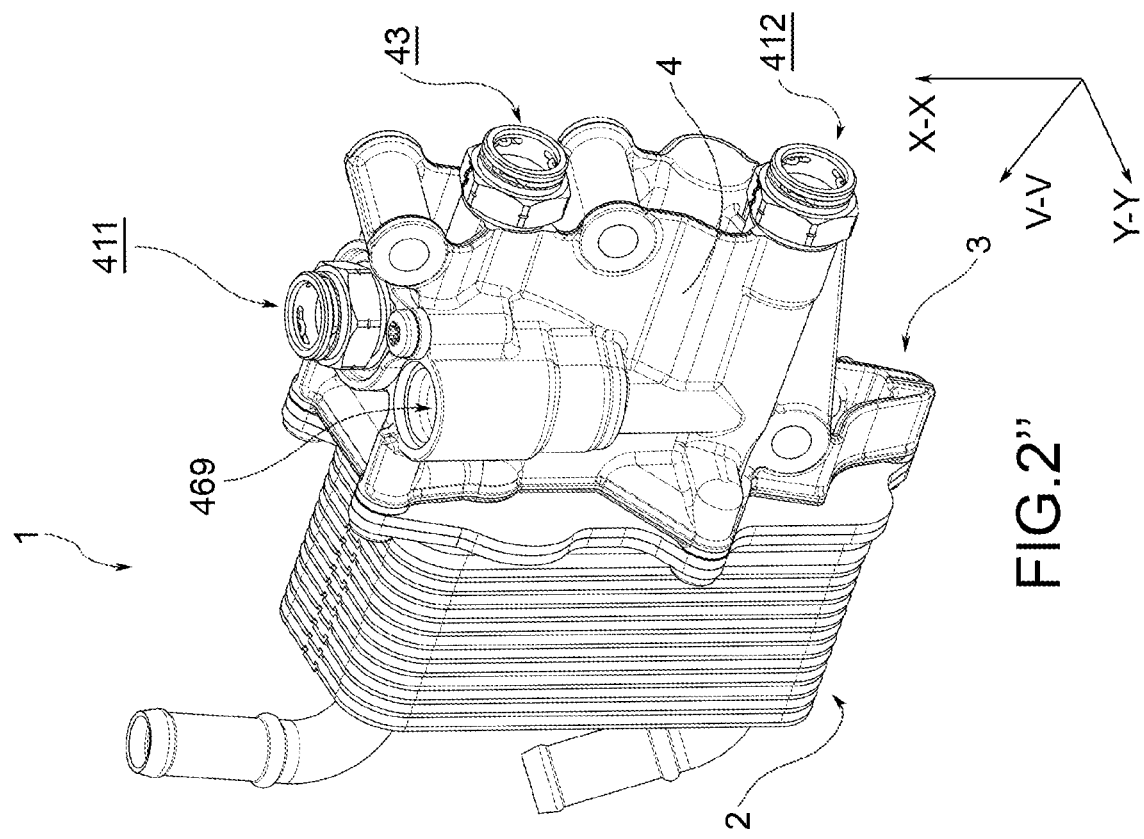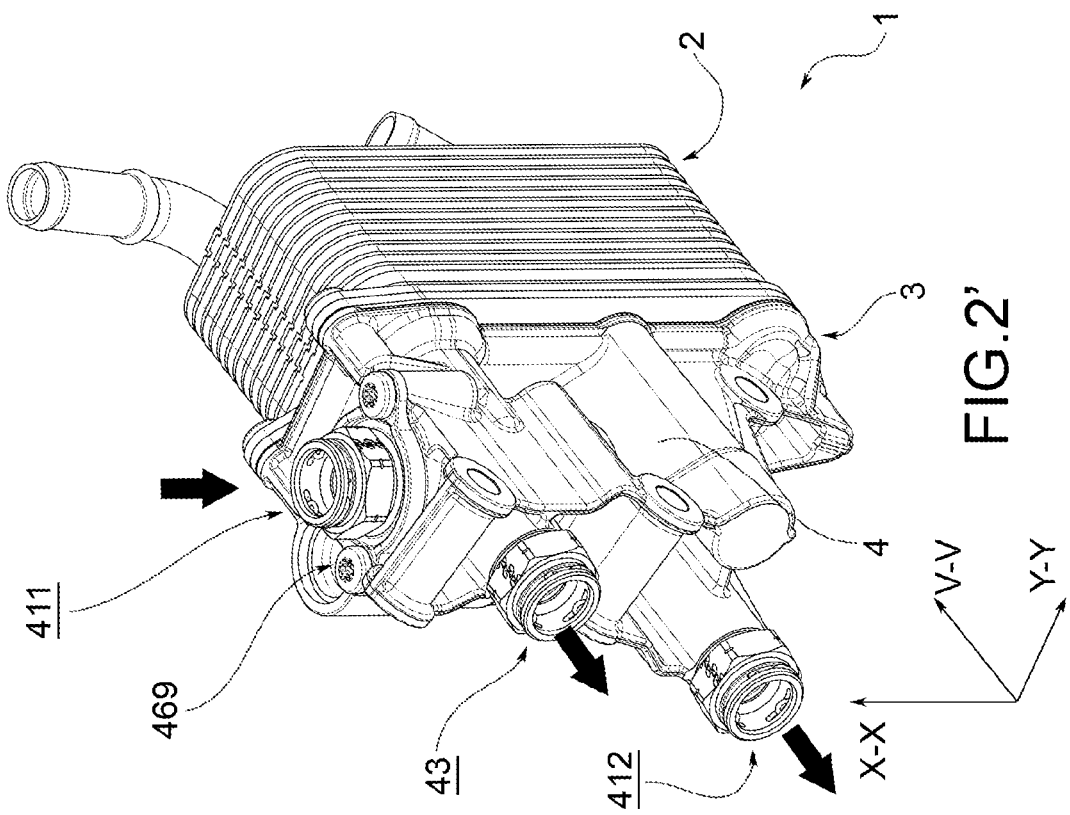

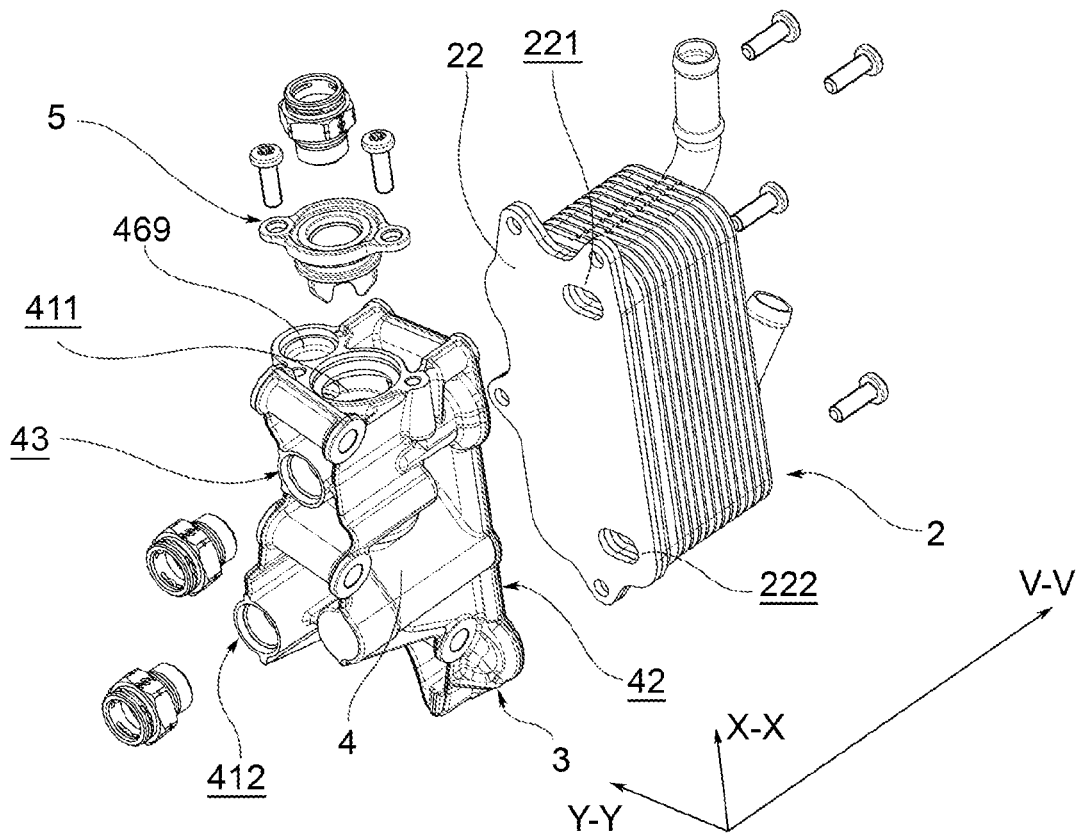
FIG.3'
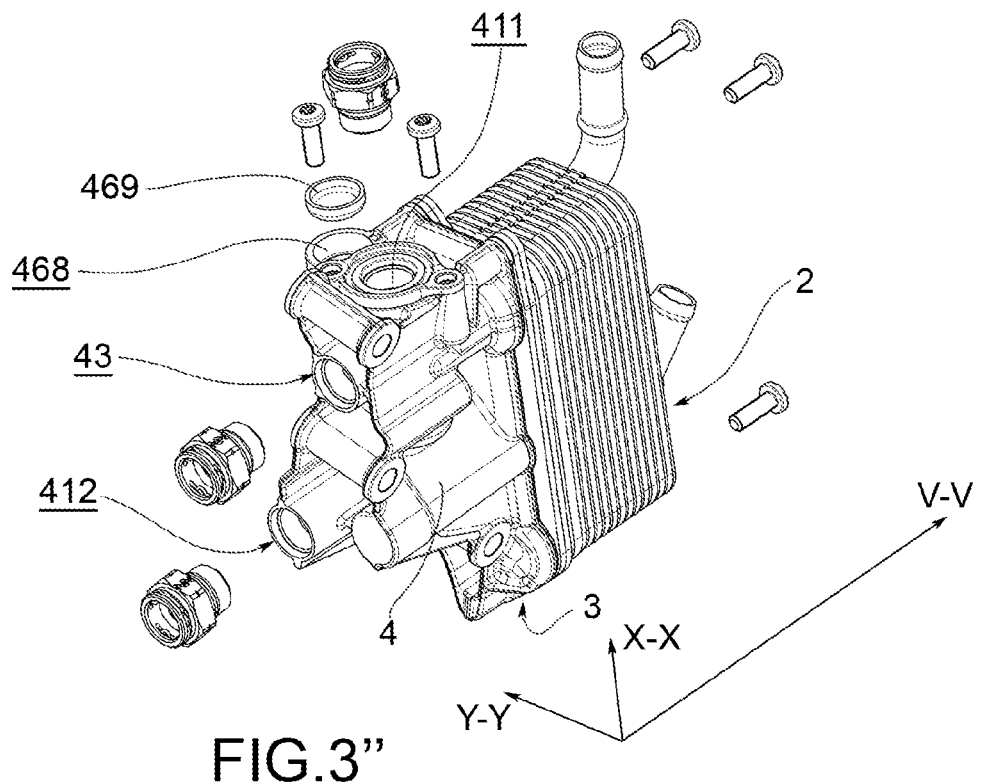
FIG.3"

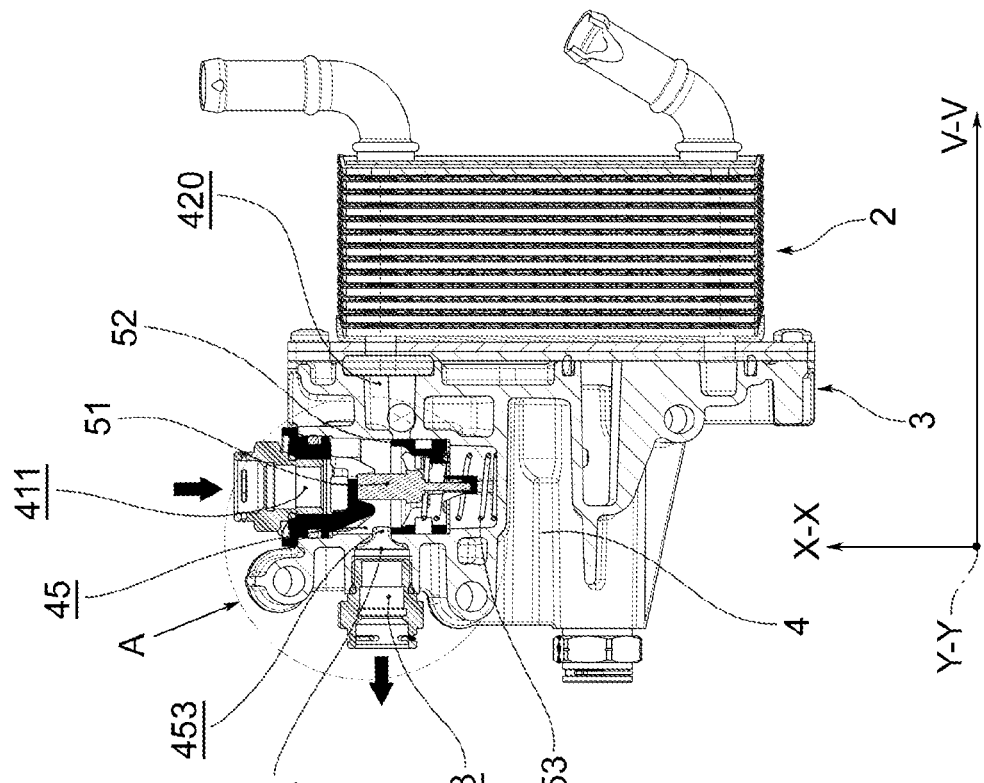
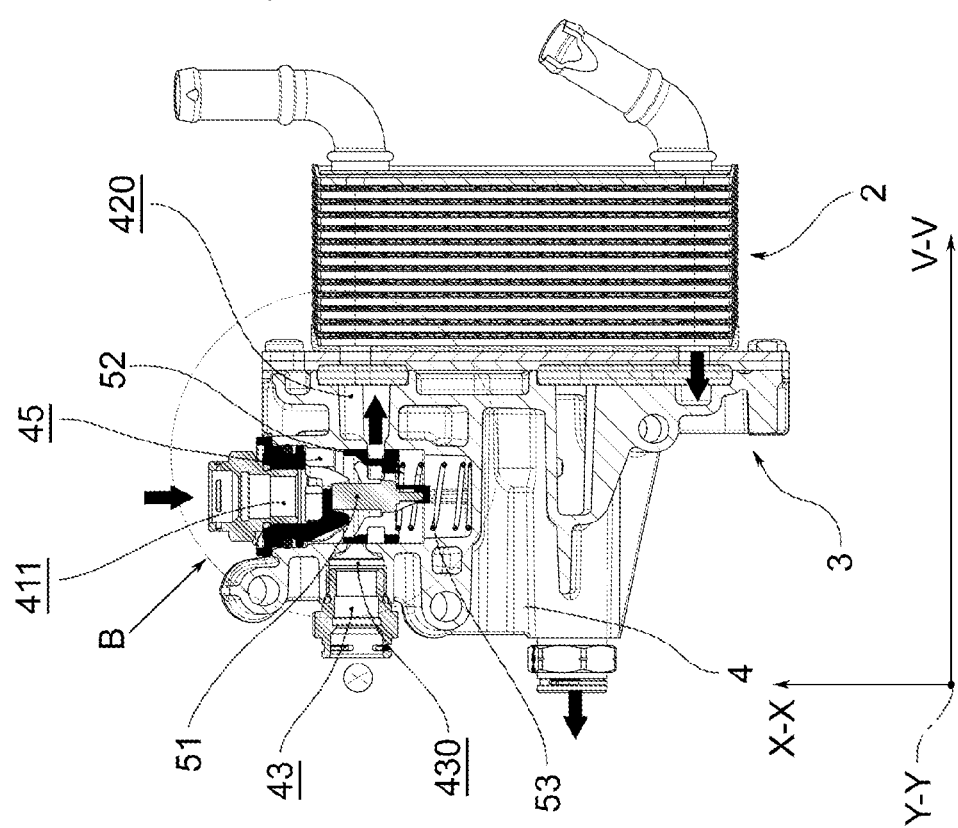
FIG.5a
FIG.5b

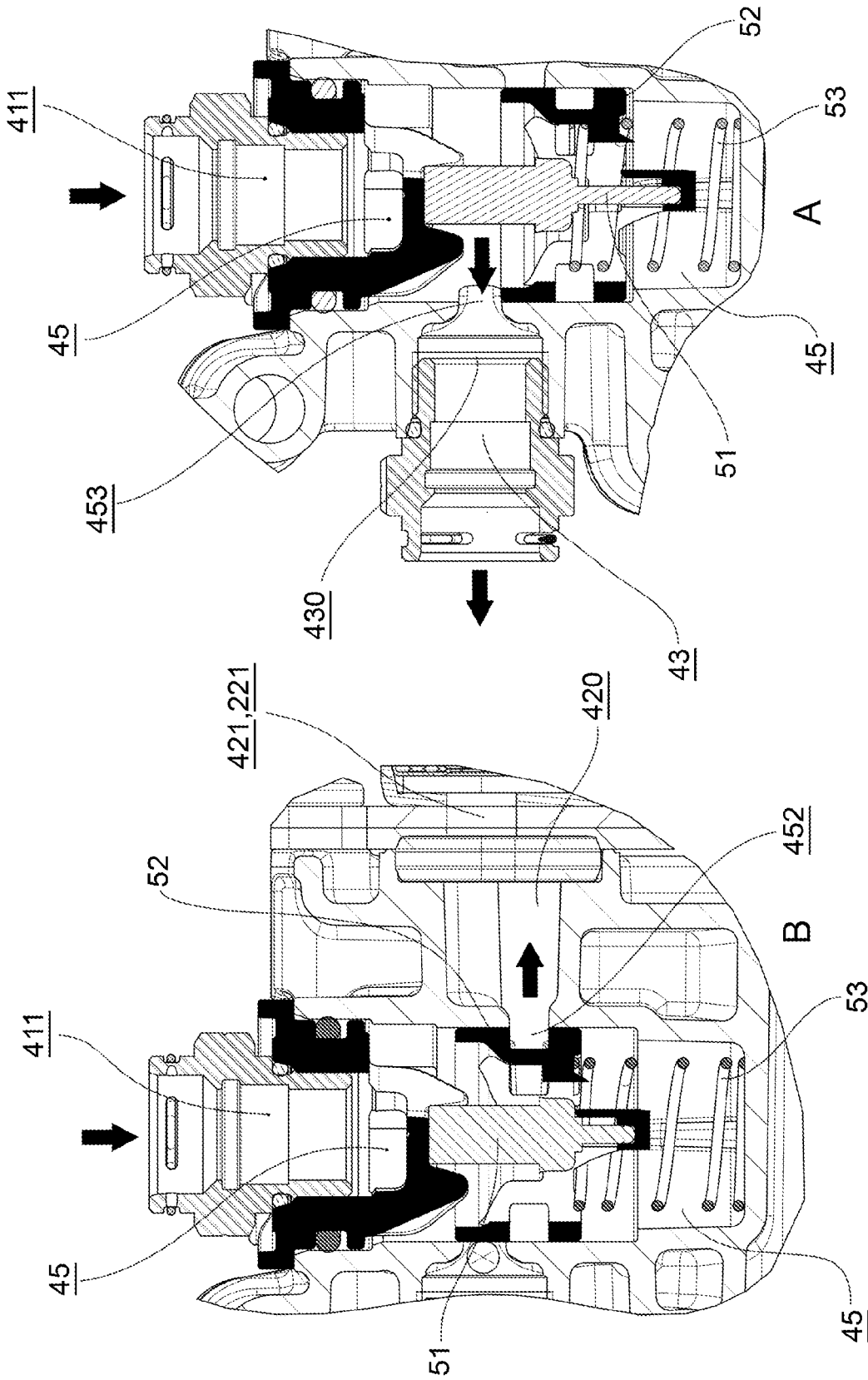

OIL TEMPERATURE MANAGEMENT ASSEMBLY

CROSS-REFERENCE TO RELATED APPLICATIONS

This application is a National Phase of International Application No. PCT/IB2022/059783, filed on Oct. 12, 2022, which claims priority to Italian Patent Application No. 102021000026771, filed on Oct. 19, 2021, the entire contents of which are incorporated herein by reference.

FIELD OF APPLICATION

The present invention relates to an oil temperature management assembly. Preferably, the present invention relates to an oil circulation system comprising said oil temperature management assembly.

In particular, the present invention relates to the automotive field.

In fact, the oil temperature management assembly of the present invention finds specific application in a vehicle with the purpose of regulating the temperature of an operating unit of the same vehicle. In particular, an operating unit refers to a component or a group of components such as an engine unit and/or a transmission unit and/or a gearbox unit or the like.

Specifically, an oil circulation system is fluidly connected to the operating unit and comprising in addition to the oil temperature management assembly, an auxiliary heat exchanger and specific ducts and openings adapted to fluidly connect the aforesaid components. Embodiments are known in which the auxiliary heat exchanger is an air-oil radiator. Embodiments are also known, in which the auxiliary heat exchanger is a plate heat exchanger.

In particular, the oil temperature management assembly comprises a primary heat exchanger and a fluid support and connection module. The module has a dual function: to make a fluid connection with said primary heat exchanger and with the auxiliary heat exchanger and to direct the oil towards one or the other component as a function of the input temperature thereof.

With particular reference to the aforesaid primary heat exchanger, it should be noted that, in addition to being part of the oil circulation system, it is also fluidly connectable to a vehicle cooling system in which a typically water-based fluid flows.

BACKGROUND ART

In the background art, solutions of oil temperature management assemblies that are comprised in oil circulation systems are known. Such known oil temperature management assemblies comprise a plate heat exchanger adapted to perform oil temperature regulation operations by heat exchange with a fluid. By means of such a heat exchanger, the oil is subjected to a heat exchange action with the cooling fluid that increases the temperature thereof.

Some known oil temperature management assemblies can be fluidly connected to an auxiliary heat exchanger adapted in turn to perform heat exchange operations with the oil. By means of the auxiliary heat exchanger, the oil is subjected to a heat exchange action which lowers the temperature thereof.

Conversely, embodiments are also known in which the oil heating operations are performed by the auxiliary heat exchanger, while the oil cooling operations are performed by the primary heat exchanger comprised in the oil temperature management assembly.

However, the known solutions of oil temperature management assemblies have particularly complex geometries and layouts, having complex fluid geometries therein, as well as complex fluid connection modes with the ducts of the oil circulation system.

Therefore, in the solutions of the background art, greater complexity of said geometries and of said layout also entail complex management of the oil flow circulation. A complex fluid management of the oil involves an inefficient and not sudden management of the oil temperature circulating in the operating unit with consequent disadvantages to the functioning of the operating unit itself.

Furthermore, in the solutions of the background art, the greater complexity of said geometries and said layouts correspond to higher production and manufacturing costs.

In addition, in the solutions of the background art, the greater complexity of said layouts correspond to specific difficulties in positioning the oil temperature management assembly inside the vehicle: moreover, the need to optimize the occupation of available spaces is particularly felt in the automotive field.

SOLUTION OF THE INVENTION

Therefore, the need is strongly felt to provide an oil temperature management assembly which solves the aforesaid problems.

The object of the present invention is to provide an oil temperature management assembly which performs the oil temperature adjustment operations in an effective manner, having the simplest possible geometry and layout of the ducts.

DESCRIPTION OF THE DRAWINGS

Further features and advantages of the invention will become apparent from the description provided below of preferred exemplary embodiments thereof, given by way of non-limiting example, with reference to the accompanying drawings, in which:

FIGS. 2' and 2" show two perspective views of an oil temperature management assembly, respectively, of the present invention, according to a preferred embodiment;

FIGS. 3' and 3" show two perspective views with separate parts and semi-separate parts, respectively, of the oil temperature management assembly of FIGS. 2' and 2";

FIGS. 5a and 5b show two partially sectional views of the oil temperature management assembly of FIGS. 2' and 2", comprising a thermostatic valve in a primary configuration and in an auxiliary configuration;

FIGS. 5a' and 5b' show two enlarged views of the particular thermostatic valve of the oil temperature management assembly of FIGS. 5a and 5b, respectively;

DETAILED DESCRIPTION

Figure 1:
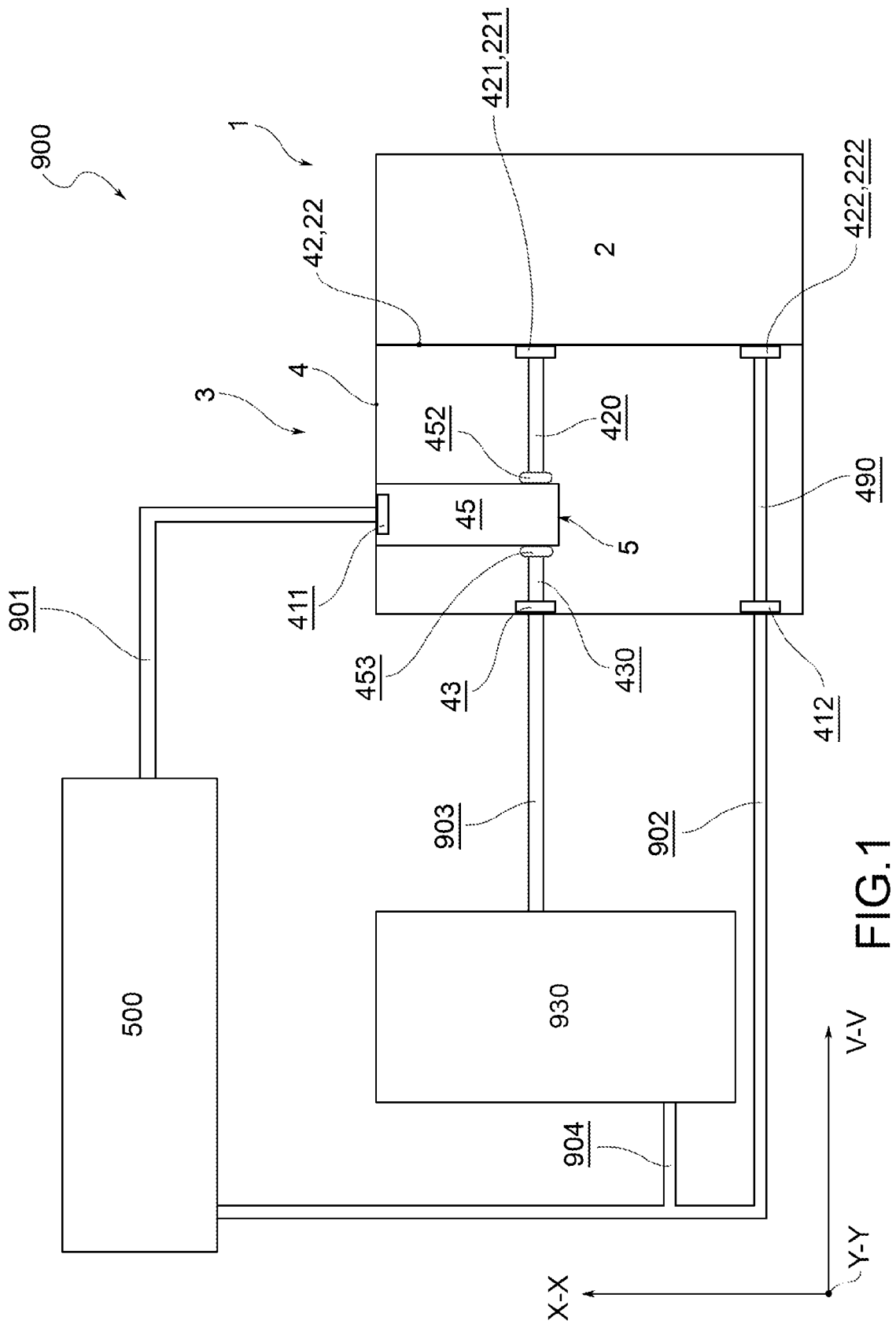
FIGS. 1, 1a and 1b diagrammatically show some embodiments of an oil circulation system in accordance with the present invention.

With reference to the accompanying figures, reference numeral 1 indicates an oil temperature management assembly in accordance with the present invention.

In particular, the oil temperature management assembly of the present invention, as widely described below, is adapted to be part of an oil circulation system of a vehicle with the purpose of managing the oil, in particular the temperature thereof, flowing into an operating unit of a vehicle. Preferably, said "operating unit" is an engine unit, for example with internal combustion or electric or hybrid propulsion, or a transmission unit or a gearbox unit.

The object of the present invention is also said oil circulation system 900.

Preferably, the oil circulation system comprises an auxiliary heat exchanger 930, the type and features of which do not limit the present invention.

According to a preferred embodiment, said auxiliary heat exchanger 930 is a radiator adapted to perform a heat exchange action between air and oil.

According to a further preferred embodiment, said auxiliary heat exchanger 930 is a plate exchanger adapted to perform a heat exchange action between oil and a second fluid, preferably a water-based liquid.

In this embodiment, the auxiliary heat exchanger 930 is fluidly connectable to a vehicle cooling system in which a further fluid, preferably a water-based liquid, flows.

Preferably, in the embodiment with auxiliary heat exchanger 930 in the form of a plate exchanger, this is (like the primary heat exchanger widely described below) comprised in the oil temperature management assembly 1.

Furthermore, the oil circulation system 900 comprises ducts for connecting the respective units and/or assemblies, some of which are described below and shown by way of example also in FIGS. 1, 1a and 1b.

Furthermore, in accordance with a preferred embodiment, the oil temperature management assembly 1 identifies a vertical axis V-V and two longitudinal axes X-X, Y-Y. In particular, the two longitudinal axes X-X, Y-Y lie on the same imaginary plane which is orthogonal to the vertical axis V-V.

In accordance with the present invention, the oil temperature management assembly 1 comprises a primary heat exchanger 2.

Preferably, the primary heat exchanger 2 is a plate heat exchanger. In the configurations described below, oil and a second fluid, for example a water-based liquid, flow in the primary heat exchanger 2.

It should be noted that the use of the terms "primary"/ "auxiliary" are used to distinguish the components and/or features and/or operating modes of some components which cooperate with the primary heat exchanger from components and/or features and/or operating modes of some components which cooperate with the auxiliary heat exchanger.

According to a preferred embodiment, "the primary heat exchanger" performs oil heating operations, while "the auxiliary heat exchanger" performs oil cooling operations. In accordance with such a preferred embodiment, "primary" can be replaced with "heating", "auxiliary" can be replaced with "cooling".

However, embodiments are foreseeable in which the primary heat exchanger and the auxiliary heat exchanger operate in inverted positions with respect to what is described in the previous paragraph.

According to a preferred embodiment, the primary heat exchanger 2 comprises, along said vertical axis V-V, a plurality of plates mutually stacked along the vertical axis V-V to define two distinct zones, one in which the oil flows and the other in which the second fluid flows.

According to a preferred embodiment, each zone comprises vertical exchanger ducts and horizontal planar regions.

Preferably, in the primary heat exchanger 2 the horizontal planar regions intended for the circulation of the oil are mutually arranged in parallel.

Preferably, in the primary heat exchanger 2 the horizontal planar regions intended for the circulation of the second fluid are mutually arranged in parallel.

Preferably, the horizontal planar regions intended for the oil circulation are mutually alternated with the planar regions of circulation of the second fluid along the vertical axis V-V.

According to a preferred embodiment, the primary heat exchanger 2 extends in height parallel to the vertical axis V-V. Preferably, said plates have a longitudinal extension with respect to the longitudinal axes X-X, Y-Y.

In accordance with the present invention, the oil temperature management assembly 1 comprises a fluid support and connection module 3.

According to the present invention, the fluid support and connection module 3 comprises a module body 4 to which the primary heat exchanger 2 is operatively connected.

In accordance with the present invention, the module body 4 comprises:

- an assembly inlet mouth 411 which is fluidly connectable to a first oil duct 901 of the oil circulation system 900 through which the oil arriving from the operating unit 500 flows and an assembly outlet mouth 412 which is fluidly connectable to a second oil duct 902 of the oil circulation system, through which the oil flows towards the operating unit 500;
- a primary exchanger inlet mouth 421 and a primary exchanger outlet mouth 422 for the fluid connection of the primary heat exchanger 2 and the module 4, in which the primary exchanger outlet mouth 422 fluidly communicates with the assembly outlet mouth 412;
- an auxiliary mouth 43, which is preferably fluidly connectable to an auxiliary oil duct 903 of the oil circulation system 900, through which the oil flows towards the auxiliary heat exchanger 930.

Figure 1A:
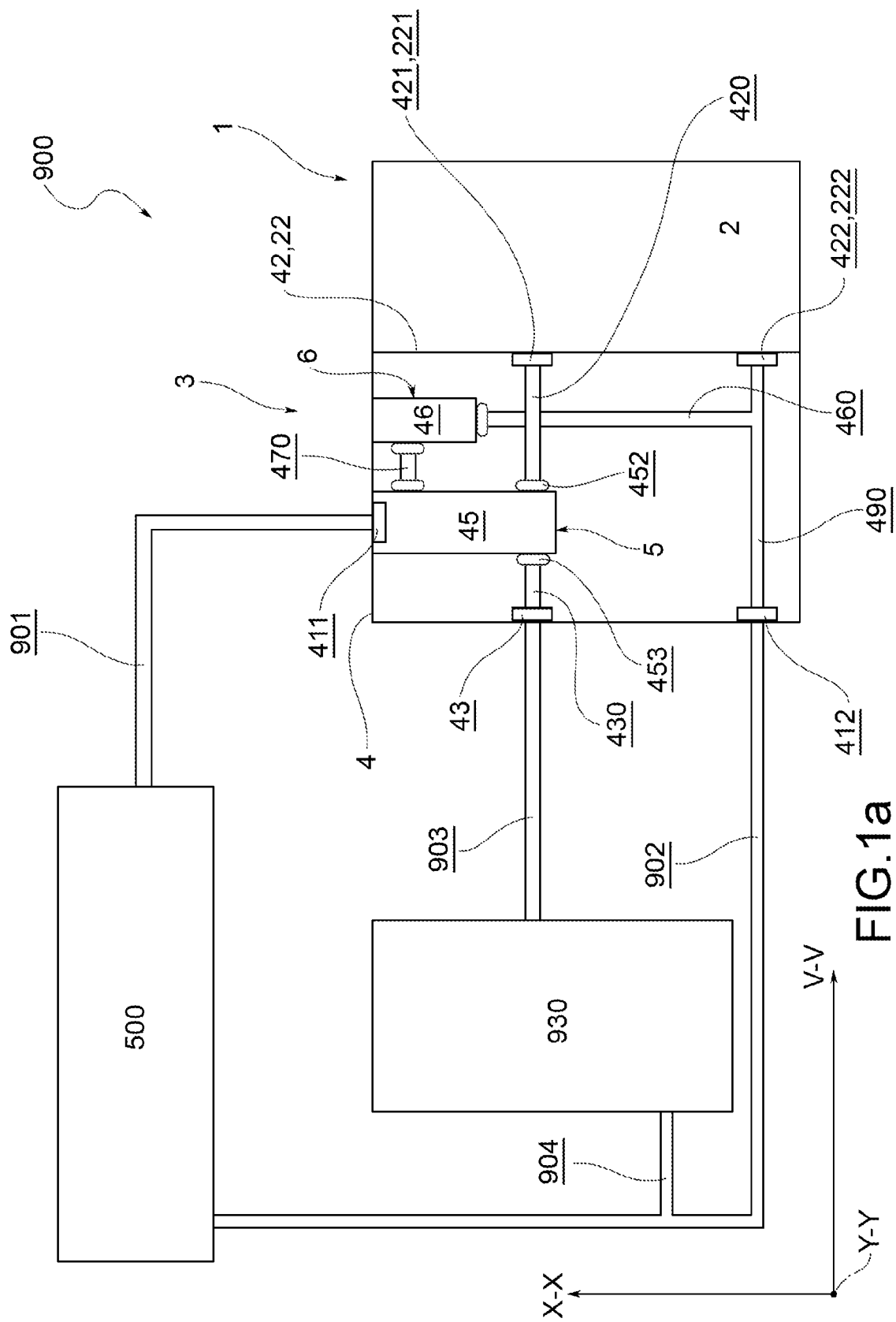

In accordance with a preferred embodiment, shown by way of example in FIGS. 1 and 1a, said auxiliary mouth 43 is fluidly connected to an auxiliary oil duct 903 in fluid connection with the auxiliary heat exchanger 930.

In accordance with a preferred embodiment, shown by way of example in FIG. 1c, said auxiliary mouth 43 is fluidly connected directly to the auxiliary heat exchanger 930.

In accordance with a preferred embodiment, said auxiliary heat exchanger 930 is fluidly connected to the operating unit 500. Preferably, the oil circulation system 900 comprises an auxiliary connecting duct 904 adapted to fluidly connect the auxiliary heat exchanger 930 to the operating unit 500.

In accordance with a preferred embodiment, said auxiliary connecting duct 904 is adapted to allow the return of the conditioned oil from the auxiliary heat exchanger 930 directly to the operating unit 500. Preferably, said auxiliary connecting duct 904 is fluidly connected to the second oil duct 902.

In accordance with a preferred embodiment, the module body 4 exclusively comprises the mouths described above. In other words, the module body 4 exclusively comprises five mouths.

In accordance with the aforesaid preferred embodiment, the inlet and outlet mouths of the second fluid, for example water, in the primary heat exchanger 2 are on the primary heat exchanger 2 itself. As shown by way of example in the accompanying drawings, in FIGS. 2' to 5b', said inlet and outlet mouths of the second fluid are positioned on the upper plane of the primary heat exchanger 2.

With particular reference to what has been described above, it is emphasized that "mouths" is used to identify the fluid passages for the oil which are adapted to allow the inlet and outlet of oil from the module body 4.

The diagrams shown in FIGS. 1 and 1a show solutions in which the auxiliary heat exchanger 930 is spaced from the oil temperature management assembly 1. Preferably in such solutions the auxiliary heat exchanger 930 is an air/oil radiator.

Figure 1B:
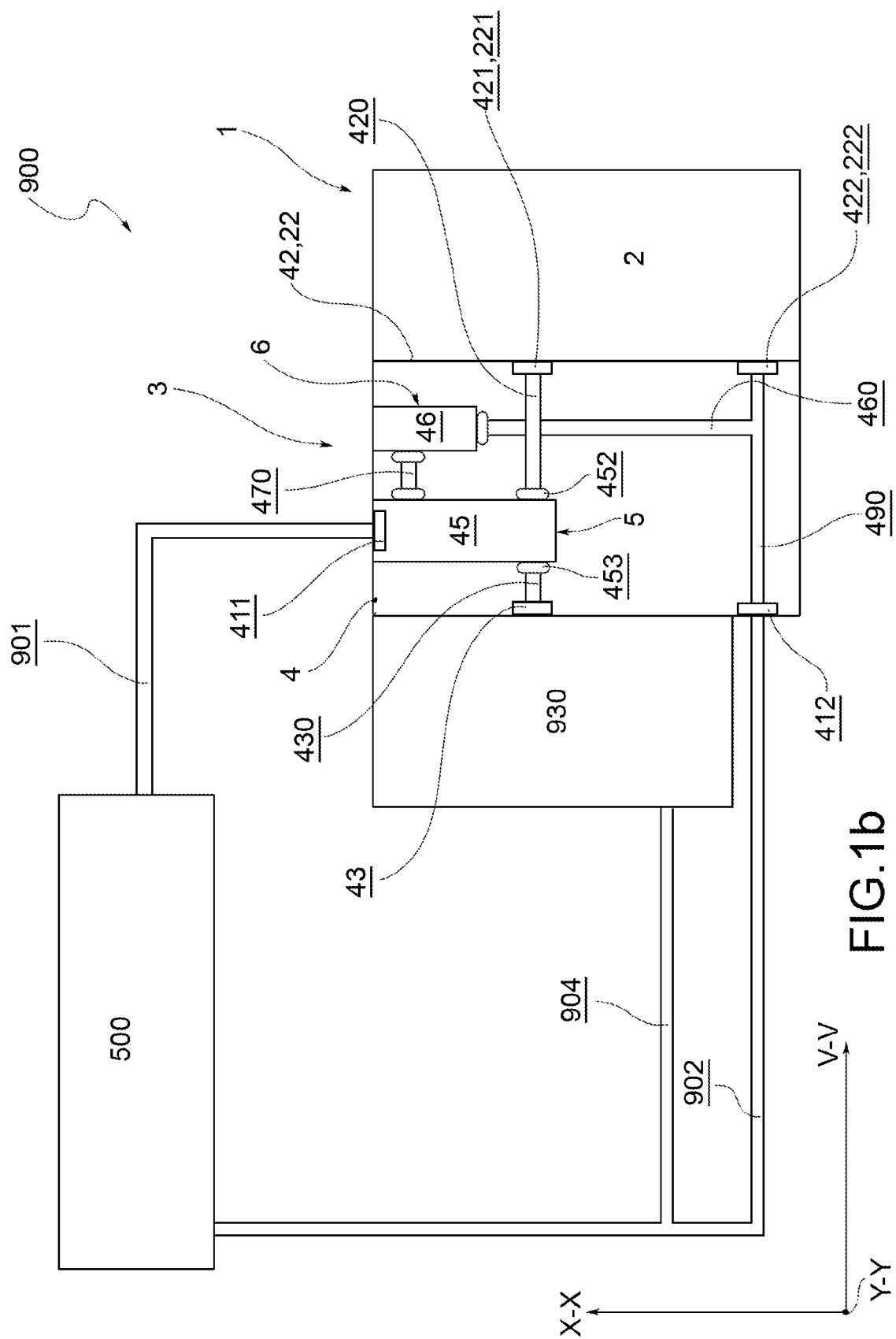
Figure 4:
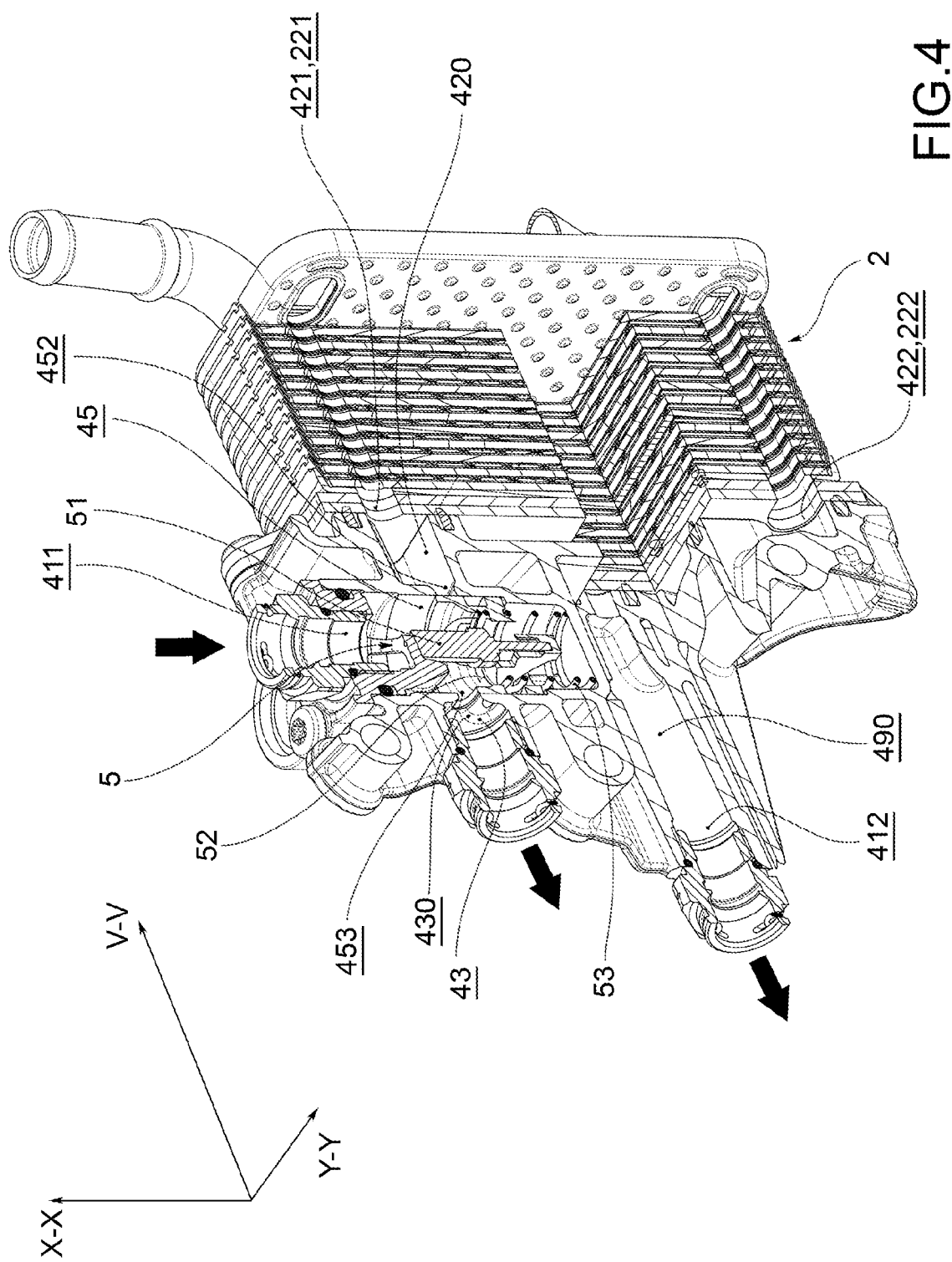
FIG. 4 is a sectioned perspective view of the oil temperature management assembly of FIGS. 2' and 2"
Figure 6A:
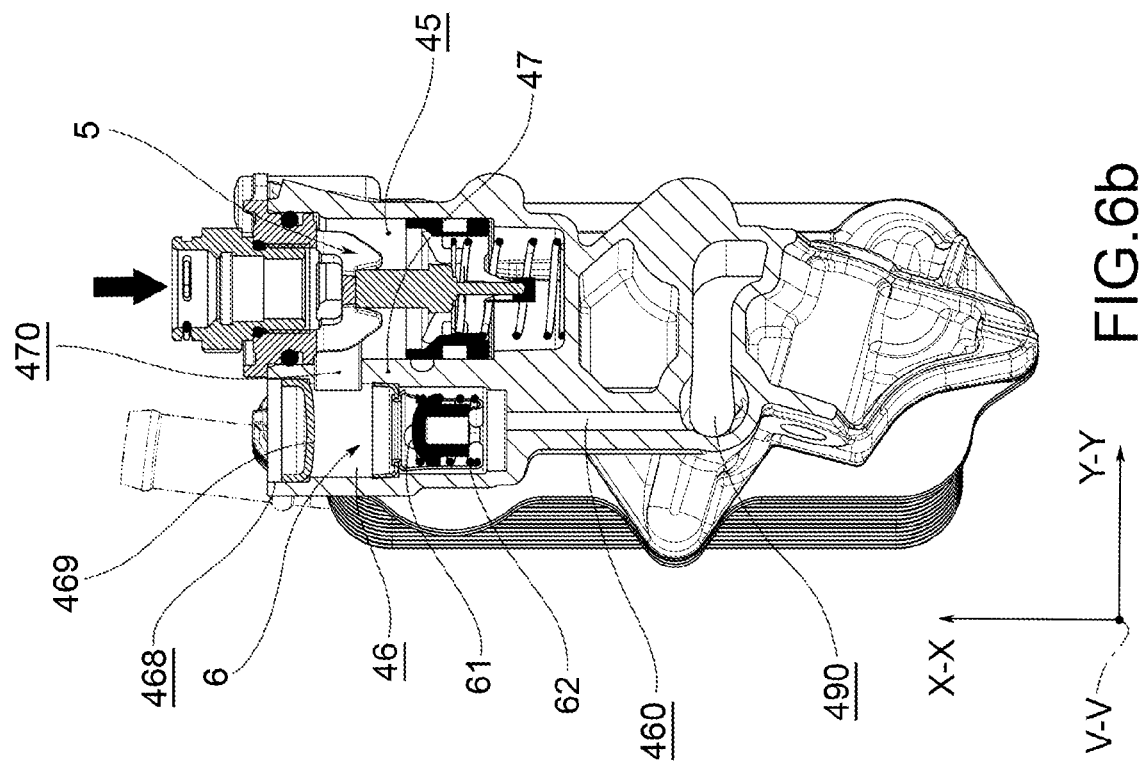
FIGS. 6a and 6b show two partially sectional views of the oil temperature management assembly of FIGS. 2' and 2", in an embodiment comprising a bypass valve in a closed configuration and in a bypass configuration.
Figure 6B:
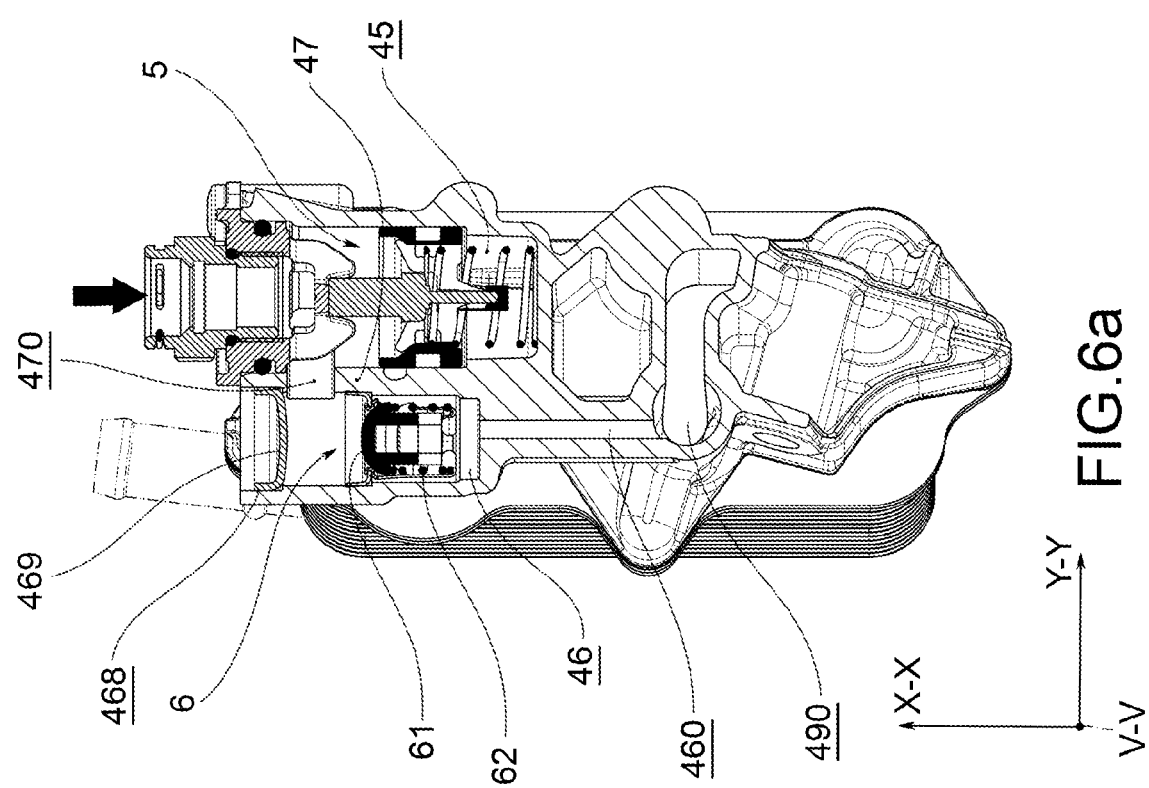

The diagram of FIG. 1b shows a preferred embodiment in which, instead, the auxiliary heat exchanger 930 is fixed to the oil temperature management assembly 1, in particular to the fluid support and connection module 3. Preferably in such a solution the auxiliary heat exchanger 930 is a plate exchanger. Preferably, the auxiliary heat exchanger 930 is comprised in the oil temperature management assembly 1.

In accordance with the present invention, the fluid support and connection module 3 further comprises a thermostatic valve 5 housed in the module body 4.

The thermostatic valve 5 is fluidly connected to the assembly inlet mouth 411, to the primary exchanger inlet mouth 421 and to the auxiliary mouth 43.

According to a preferred embodiment, the thermostatic valve 5 is configured to direct the flow of oil between an inlet mouth in fluid communication with the operating unit 500 and two outlet mouths in fluid communication with the primary heat exchanger 2 and with the auxiliary heat exchanger 930, respectively.

In accordance with the present invention, the thermostatic valve 5 detects the temperature of the oil entering the module 3.

In accordance with a preferred embodiment, the thermostatic valve 5 is fluidly positioned upstream of the primary heat exchanger 2.

In accordance with a preferred embodiment, the thermostatic valve 5 is fluidly positioned upstream of both the primary heat exchanger 2 and the auxiliary heat exchanger 930.

According to a preferred embodiment, the thermostatic valve 5 is positioned in a region closer to the assembly inlet mouth 411 than it is with respect to the assembly outlet mouth 412 and with respect to the primary exchanger inlet mouth 421.

In accordance with the present invention, the thermostatic valve 5 can be configured with respect to a threshold temperature value in a primary configuration in which it directs the oil towards the primary exchanger inlet mouth 421 and in an auxiliary configuration in which it directs the oil towards the auxiliary mouth 43.

In accordance with the present invention, the thermostatic valve 5 is configurable as a function of the oil temperature entering the module 3 in a primary configuration in which it directs the oil towards the primary exchanger inlet mouth 421 and in an auxiliary configuration in which it directs the oil towards the auxiliary mouth 43.

In other words, the thermostatic valve 5 detects the need to increase the oil temperature or to lower the oil temperature and is arranged in one of the aforesaid configurations.

In accordance with a preferred embodiment, the entire amount of oil that reaches the thermostatic valve 5 is directed towards the primary heat exchanger 2 or towards the auxiliary heat exchanger 930.

According to a preferred embodiment, the thermostatic valve 5 is configurable in one or more intermediate configurations between the two described above in which the oil flow entering the module 3 is reduced between the primary exchanger inlet moth 421 and the auxiliary mouth 43.

In accordance with a preferred embodiment, the module body 4 comprises a thermostatic valve housing 45 in which the thermostatic valve 5 is housed.

According to a preferred embodiment, said thermostatic valve housing 45 extends in length from the assembly inlet mouth 411. Preferably, said thermostatic valve housing 45 extends longitudinally. Preferably, said thermostatic valve housing 45 extends parallel to a longitudinal extension direction X-X or Y-Y.

In accordance with a preferred embodiment, the thermostatic valve 5 comprises a temperature-sensitive element 51 and a shutter element 52 moved by said temperature-sensitive element 51.

Preferably, the temperature-sensitive element 51 is made in the form of a wax element or in the form of a shape memory spring.

Preferably, the shutter element 52 is moved longitudinally.

Preferably, the shutter element 52 is moved rotationally.

In accordance with a preferred embodiment, the temperature-sensitive element 51 is positioned at least partially between the assembly inlet mouth 411 and the shutter element 52.

In other words, the oil entering from the assembly inlet mouth 411 first encounters the temperature-sensitive element 51 with respect to the shutter element 52.

According to a preferred embodiment, the temperature-sensitive element 51 of the thermostatic valve 5 faces the assembly inlet mouth 411.

According to a preferred embodiment, the thermostatic valve 5 further comprises an elastic element 53 adapted to operate in the opposite direction with respect to the temperature-sensitive element 51. In other words, the temperature-sensitive element 51 must overcome the action of the elastic element 53 to modify the position of the shutter element 52.

Preferably, said elastic element 53 is made in the form of a helical spring.

Preferably, the thermostatic valve 5 is in a position normally corresponding to the primary configuration.

In accordance with a preferred embodiment, the thermostatic valve housing 45 comprises a primary opening 452 and an auxiliary opening 453. In the primary configuration, the shutter 52 is positioned so as to open the primary opening 452 and close the auxiliary opening 453, and, in the auxiliary configuration, the shutter 52 is positioned so as to close the primary opening 452 and open the auxiliary opening 453.

According to a preferred embodiment, in the primary configuration, the shutter 52 is positioned so as to open the primary opening 452 and close the auxiliary opening 453 and, in the auxiliary configuration 453, the shutter 52 is positioned so as to open the primary opening and the auxiliary opening 453.

In accordance with a preferred embodiment, the module body 4 comprises a primary section 420 connecting the primary opening 452 and the primary exchanger inlet mouth 421 and comprises an auxiliary section 430 connecting the auxiliary opening 453 and the auxiliary mouth 43.

In accordance with a preferred embodiment, the primary section 420 and/or the auxiliary section 430 have an extension substantially parallel to the vertical axis V-V.

In accordance with a preferred embodiment, the primary section 420 and/or the auxiliary section 430 have a substantially transverse extension with respect to the housing of the thermostatic valve 45.

Furthermore, according to a preferred embodiment, the module body 4 comprises an outlet section 490 connecting the primary exchanger outlet mouth 422 with the assembly outlet mouth 412.

In accordance with a preferred embodiment, said outlet section 490 extends substantially parallel to the vertical axis V-V.

In accordance with a preferred embodiment, the fluid support and connection module 3 further comprises a bypass valve 6.

Said bypass valve 6 is in fluid communication with the inlet mouth 411 and with the thermostatic valve 5.

In accordance with a preferred embodiment, the bypass valve 6 operates in parallel with the thermostatic valve 5. In other words, the thermostatic valve 5 and the bypass valve 6 are arranged in parallel with respect to the circulation direction of the oil entering the module 3.

In particular, the thermostatic valve 5 and the bypass valve 6 are in fluid communication with the same oil supply mouth, i.e., the assembly inlet mouth 411, and are configured to direct the flow of oil towards respective oil circulation mouths and/or ducts according to the temperature and pressure of the oil entering the module 3.

According to a preferred embodiment, the bypass valve 6 is fluidly connected to the assembly outlet mouth 421.

In accordance with a preferred embodiment, the bypass valve 6 is normally in a closed configuration in which the oil flows entirely towards the thermostatic valve 5. Furthermore, the bypass valve 6 can be configured in a bypass configuration, when an oil flow having a pressure higher than a threshold pressure value flows, in which the oil flows directly towards the assembly outlet mouth 412.

In accordance with a preferred embodiment, in the bypass configuration the bypass valve 6 puts the assembly inlet mouth 411 in fluid communication with the assembly outlet mouth 412, directing the flow of oil directly towards the operating unit 500 allowing the oil flow to avoid circulation through the primary heat exchanger 2 and the auxiliary heat exchanger 930 when certain pressure conditions persist.

According to a preferred embodiment, the bypass valve 6 avoids the occurrence of an operating condition in which high pressure oil flows into the primary heat exchanger 2 or into the auxiliary heat exchanger 930.

In accordance with a preferred embodiment, the bypass valve 6 comprises a closure element 61 and an elastically yielding element 62.

Preferably, in the bypass configuration the action of the pressure exerted by the oil flow on the closure element 61 overcomes the force of the elastically yielding element 62 by changing the position of the closure element 61.

According to a preferred embodiment, the module body 4 comprises a bypass section 460 connecting the bypass valve 6 to the assembly outlet mouth 412, preferably to the outlet section 490.

According to a preferred embodiment, the bypass section 460 extends substantially in a longitudinal direction.

In accordance with a preferred embodiment, the module body 4 comprises a bypass valve housing 46 for housing the bypass valve 6.

In accordance with a preferred embodiment, the bypass section 460 is in fluid communication with the bypass valve housing 6.

According to a preferred embodiment, the thermostatic valve housing 45 and the bypass valve housing 46 are in fluid communication by means of a connection passageway 470.

Preferably, said connection passageway 470 is positioned to be proximal to the assembly inlet mouth 411 with respect to the thermostatic valve 5.

According to a preferred embodiment, the thermostatic valve housing 45 and the bypass valve housing 46 are in fluid communication by means of a connection passageway 470, preferably positioned to be proximal to the assembly inlet mouth 411 with respect to the shutter element 52 of the thermostatic valve 5.

According to a preferred embodiment, the thermostatic valve housing 45 and the bypass valve housing 46 extend parallel to each other.

Preferably, the thermostatic valve housing 45 and the bypass valve housing 46 extend along respective axes oriented substantially parallel.

In accordance with a preferred embodiment, the thermostatic valve housing 45 and the bypass valve housing 46 are mutually separated by a partition wall 47 comprised in the module body 4, in which said connection passageway 470 is obtained in said partition wall 47.

According to a preferred embodiment, said connection passageway 470 is identified by the presence of a recess or a lowering of the partition wall 47 adapted to allow the fluid connection between the thermostatic valve 5 and the bypass valve 6 or between the respective thermostatic valve housing 45 and bypass valve housing 46.

In other words, according to a preferred embodiment the partition wall 47 extends in height dividing the thermostatic valve housing 45 and the bypass valve housing 46 up to a region near the assembly inlet mouth 411 in which the connection passageway 470 is positioned.

In accordance with a preferred embodiment, the assembly inlet mouth 411 supplies oil to both the thermostatic valve housing 45 and the bypass valve housing 46, in which the thermostatic valve 5 and the bypass valve 6 operate in accordance with what is described above.

Preferably, the thermostatic valve housing 45 and the bypass valve housing 46 are filled with the circulating oil according to the principle of vessels communicating through the connection passageway 470.

In accordance with a preferred embodiment, while the thermostatic valve 5 manages the oil circulation as a function of the temperature, an oil pressure peak detected by the bypass valve 6 allows the management of any overpressure.

In addition, according to a preferred embodiment, the module body 4 comprises a valve insertion hole 468 inside which the bypass valve 6 can be inserted. Preferably, the module body 4 comprises a closure plug 469 adapted to close said insertion hole 460.

According to a preferred embodiment, the module body 4 comprises an insertion hole for the thermostatic valve 5 and an insertion hole for the bypass valve 6. Preferably, the module body 4 comprises a closure plug adapted to close both of the insertion holes described above.

According to a preferred embodiment, the module body 4 comprises a planar module face 42. Preferably, the primary exchanger inlet mouth 421 and the primary exchanger outlet mouth 422 lie on said planar module face 42.

Preferably, the same primary heat exchanger 2 comprises a planar exchanger face 22 on which an inlet opening 221 and an outlet opening 222 lie, facing the primary exchanger inlet mouth 421 and the primary exchanger outlet mouth 422, respectively. Preferably, the vertical ducts of the zone into which the oil flows extend vertically from said inlet opening 221 and from said outlet opening 222.

In accordance with a preferred embodiment, the module body 4 comprises respective gaskets surrounding the primary exchanger inlet mouth 421 and the primary exchanger outlet mouth 422 to allow the fluid coupling of the primary heat exchanger 2 to the module body 4.

According to a preferred embodiment, the module body 4 is a monolithic body made of aluminum alloy by casting or die casting.

According to a preferred embodiment, the module body 4 is a monolithic body made of plastic material by an injection molding process.

In accordance with a preferred embodiment, the base plate of the primary heat exchanger 2 has special slots which can be crossed by screws for fastening the primary heat exchanger 2 to the module body 4.

According to a preferred embodiment, the primary heat exchanger 2 and the module body 4 can be fixed by brazing.

In accordance with a preferred embodiment, the auxiliary heat exchanger 930 interfaces with the module body 4 in accordance with the methods described above for the connection of the module body 4 to the primary heat exchanger 2.

Preferably, in the tables shown by way of example, the module body 4 comprises specific fittings positioned at the assembly inlet mouth 411, the assembly outlet mouth 412 and the auxiliary mouth 43 to facilitate the engagement with the first oil duct 901, with the second oil duct 902 and with the cooling duct 903.

Innovatively, the oil temperature management assembly amply fulfills the object of the present invention by overcoming the typical problems of the known art.

Advantageously, in fact, the oil temperature management assembly has a particularly simple layout in the "fluid part" thereof and in the fluid connections thereof with the respective operating unit.

Advantageously, the oil temperature management assembly is adapted to detect the entering oil temperature in a precise and timely manner by performing a timely management of the oil in both the heating step, for example directing the oil flow towards the primary heat exchanger, and in the cooling step, for example directing the oil flow towards the auxiliary heat exchanger.

Advantageously, the oil temperature management assembly has optimized fluid paths inside the module body, resulting extremely efficient in reducing the pressure drops imposed on the oil circulation system and associated with the operation of the oil temperature management assembly.

Advantageously, the positioning of the thermostatic valve upstream of the primary exchanger and of the auxiliary exchanger allows to reduce the number of circulation mouths and ducts inside the module body, simplifying the structure thereof, production process and the costs associated with the manufacture thereof.

Advantageously, the positioning of the thermostatic valve upstream of the primary exchanger and of the auxiliary exchanger allows to reduce the number of openings and the length of the system circulation ducts, reducing the pressure drops imposed on the oil circulation system associated with the operation of the oil temperature management assembly.

Advantageously, the use of a module body comprising the circulation mouths described, combined with the positioning of the thermostatic valve upstream of the primary heat exchanger, allows the oil circulating through the auxiliary exchanger to be directed directly towards the operating unit, avoiding the return of the conditioned oil towards the oil temperature management assembly. This solution simplifies the structure of the oil circulation system and the module body, reducing the costs associated with the production of the oil temperature management assembly and the circulation system itself.

Advantageously, the presence of the bypass valve and the positioning of the bypass valve allow both the primary heat exchanger and the auxiliary heat exchanger to be fluidly bypassed, i.e., in both "heating" and "cooling" conditions, preserving these components from unwanted overpressures for the entire set of operating conditions foreseen by the oil temperature management assembly.

Advantageously, the presence and positioning of the bypass valve allows the thermostatic valve, the primary heat exchanger and the auxiliary heat exchanger to be bypassed in both "heating" and "cooling" conditions, ensuring a rapid response to pressure and temperature changes, managing the circulation of the oil to and from the operating unit in an extremely optimized manner.

Advantageously, the mutual positioning of the thermostatic valve and of the bypass valve allow an extremely functional and effective mutual operation.

Advantageously, the thermostatic valve and the bypass valve communicate with the same oil supply opening resulting extremely reactive and ready in detecting and managing the oil circulation as a function of both the temperature and pressure thereof.

Advantageously, the mutual positioning of the thermostatic valve and the bypass valve allows the creation of an oil management assembly capable of controlling the oil circulation both as a function of temperature and as a function of pressure using two valves installed in respective housings, in which each valve has a simple and cost-effective structure.

Advantageously, the presence of a thermostatic valve housing in communication with a bypass valve housing allows to integrate both the temperature control and the pressure control on the management assembly avoiding the use of multifunction valves which can be installed in a single housing and characterized by a complex structure and high production costs.

Advantageously, the use of control valves with a simple structure, installed in respective housings in fluid communication allows to increase the reliability of the temperature management assembly, minimizing the risks of possible malfunctions of the operating unit and the circulation system.

Advantageously, the oil temperature management assembly ensures a high maximization of the exploitation of the spaces in the vehicle. Advantageously, the oil temperature management assembly is particularly flexible in the application thereof, for example allowing the designer to fully exploit the free spaces in the vehicle.

It is apparent that, in order to meet contingent needs, those skilled in the art may make changes to the above-described oil temperature management assembly, all contained within the scope of protection as defined by the following claims.

REFERENCE NUMERAL LIST 1 oil temperature management assembly
2 primary heat exchanger
22 planar exchanger face
221 inlet opening
222 outlet opening
3 fluid support and connection module
4 module body
411 assembly inlet mouth
412 assembly outlet mouth
42 planar module face
420 primary section
421 primary exchanger inlet mouth
422 primary exchanger outlet mouth
43 auxiliary mouth
430 auxiliary section
45 thermostatic valve housing
452 primary opening
453 auxiliary opening
46 bypass valve housing
460 bypass section
468 valve insertion hole
469 closure plug
47 partition wall
470 connection passageway
5 thermostatic valve
51 temperature-sensitive element
52 shutter element
53 elastic element
6 bypass valve
61 closing element
62 elastically yielding element
500 operating unit
900 oil circulation system
901 first oil duct
902 second oil duct
903 auxiliary oil duct
904 auxiliary connection duct
930 auxiliary heat exchanger
X-X, Y-Y longitudinal axes
V-V vertical axis

The invention claimed is:

1. An oil temperature management assembly fluidically connectable to an oil circulation system of an operating group of a vehicle, wherein said oil circulation system comprises an auxiliary heat exchanger, wherein the oil temperature management assembly comprises a primary heat exchanger and a fluidic support and connection module comprising:
   i) a module body to which the primary heat exchanger is operatively connected, comprising:
      an assembly inlet mouth fluidically connectable to a first oil duct of the oil circulation system through which oil arriving from the operating group flows and an assembly outlet mouth fluidically connectable to a second oil duct of the oil circulation system through which the oil flows towards the operating group;
      a primary exchanger inlet mouth and a primary exchanger outlet mouth for fluidic connection of the primary heat exchanger and the module, wherein the primary exchanger outlet mouth fluidically communicates with the assembly outlet mouth;
      an auxiliary mouth;
   wherein said module body comprises only the mouths;
   ii) a thermostatic valve housed in the module body, fluidically connected to the assembly inlet mouth, the primary exchanger inlet mouth and the auxiliary mouth, wherein the thermostatic valve detects the temperature of the oil entering the module and is configurable with respect to a threshold temperature value in a primary configuration in which the thermostatic valve directs the oil towards the primary exchanger inlet mouth and in an auxiliary configuration in which the thermostatic valve directs the oil towards the auxiliary mouth.

2. The oil temperature management assembly according to claim 1, wherein the module body comprises a thermostatic valve housing in which the thermostatic valve is housed, wherein said thermostatic valve housing extends in length from the assembly inlet mouth.

3. The oil temperature management assembly according to claim 1, wherein the thermostatic valve comprises a temperature-sensitive element and a shutter element moved by said temperature-sensitive element, wherein the temperature-sensitive element is positioned at least partially between the assembly inlet mouth and the shutter element.

4. The oil temperature management assembly according to claim 1, wherein the thermostatic valve housing comprises a primary opening and an auxiliary opening, wherein in the primary configuration the thermostatic valve is positioned to open the primary opening and close the auxiliary opening, and wherein in the auxiliary configuration the thermostatic valve is positioned to close the primary opening and open the auxiliary opening.

5. The oil temperature management assembly according to claim 4, wherein the module body comprises a primary section connecting the primary opening and the primary exchanger inlet mouth and comprises an auxiliary section connecting the auxiliary opening and the auxiliary mouth, wherein both the primary section and the auxiliary section extend substantially parallel to the vertical axis.

6. The oil temperature management assembly according to claim 4, wherein the module body-comprises an outlet section connecting the primary exchanger outlet mouth to the assembly outlet mouth, wherein said outlet section extends substantially parallel to the vertical axis.

7. The oil temperature management assembly according to claim 1, comprising a vertical axis and two longitudinal axes lying mutually orthogonal to one another, wherein the primary heat exchanger extends vertically parallel to said vertical axis, wherein the thermostatic valve extends substantially parallel to a longitudinal axis.

8. The oil temperature management assembly according to claim 1, wherein the fluidic support and connection module further comprises a bypass valve in fluidic communication with the assembly inlet mouth and the thermostatic valve, wherein the bypass valve is fluidically connected to the assembly outlet mouth, wherein the bypass valve is normally in a closed configuration in which the oil flows entirely towards the thermostatic valve and is configurable in a bypass configuration, when oil flow having a pressure greater than a threshold pressure value flows, and in which the oil flows directly towards the assembly outlet mouth.

9. The oil temperature management assembly according to claim 8, wherein the module body comprises a bypass section connecting the bypass valve to the assembly outlet mouth.

10. The oil temperature management assembly according to claim 8, wherein the module body comprises a bypass valve housing for housing the bypass valve, wherein said bypass valve housing is in fluidic communication with the thermostatic valve.

11. The oil temperature management assembly according to claim 10, wherein the module body comprises a thermostatic valve housing in which the thermostatic valve is housed, wherein said thermostatic valve housing extends in length from the assembly inlet mouth, and wherein the thermostatic valve housing and the bypass valve housing are in fluidic communication by a connection passageway.

12. The oil temperature management assembly according to claim 11, wherein the thermostatic valve housing and the bypass valve housing extend parallel to each other.

13. The oil temperature management assembly according to claim 12, wherein the module body comprises a partition wall separating the thermostatic valve housing and the bypass valve housing, wherein the connection passageway is in said partition wall.

14. The oil temperature management assembly according to claim 10, wherein the thermostatic valve housing and the bypass valve housing are in fluidic communication by a connection passageway positioned proximal to the assembly inlet mouth with respect to the thermostatic valve.

15. The oil temperature management assembly according to claim 8, wherein the module body comprises a valve insertion hole in which the bypass valve is insertable, comprising a closure plug for closing said insertion hole.

16. The oil temperature management assembly according to claim 8, wherein the module body comprises a bypass section connecting the bypass valve to the assembly outlet mouth, to the outlet section.

17. The oil circulation system of an operating group of a vehicle, wherein said oil circulation system comprises an auxiliary heat exchanger and an oil temperature management assembly according to claim 1.

18. The oil circulation system according to claim 17, wherein the operating group of a vehicle comprises an engine group or a transmission group or a gearbox group.

19. The oil temperature management assembly according to claim 1, wherein the auxiliary mouth is fluidically connectable to an auxiliary oil duct of the oil circulation system, through which the oil flows towards the auxiliary heat exchanger.

20. The oil temperature management assembly according to claim 1, wherein the operating group of a vehicle comprises an engine group or a transmission group or a gearbox group.

* * * * *